United States Patent [19]
Henderson

[11] 3,934,618
[45] Jan. 27, 1976

[54] JACKETED PIPE ASSEMBLY FORMED OF CORRUGATED METAL TUBES

[75] Inventor: James R. Henderson, Charlotte, N.C.

[73] Assignee: Controls Southeast, Inc., Charlotte, N.C.

[22] Filed: Aug. 26, 1974

[21] Appl. No.: 500,744

[52] U.S. Cl. .................. 138/114; 138/116; 138/178
[51] Int. Cl.² .......................................... F16L 9/18
[58] Field of Search ........... 138/111, 109, 114, 115, 138/116, 177, 178, 121, 123, 127, 135

[56] References Cited
UNITED STATES PATENTS

| | | | |
|---|---|---|---|
| 2,765,182 | 10/1956 | Williamson | 138/109 |
| 3,091,281 | 5/1963 | Clark | 138/109 |
| 3,224,795 | 12/1965 | Conley | 138/109 |
| 3,717,718 | 2/1973 | Schmidtchen | 138/114 |

Primary Examiner—Houston S. Bell, Jr.
Attorney, Agent, or Firm—Parrott, Bell, Seltzer, Park & Gibson

[57] ABSTRACT

A jacketed pipe assembly of inner and outer tubular members including respective inner and outer corrugated metal tubes arranged in spaced relationship to define therebetween a fluid-circulating chamber adapted for the circulation therethrough of a temperature controlling fluid for aiding in the flow of a processing fluid through the inner tubular member. Means including connecting welds are provided for interconnecting respective opposite ends of the inner and outer tubular members in such a manner as to define opposite end walls of the fluid-circulating chamber and to insure that cross-contamination between the inner corrugated tube and the surrounding fluid-circulating chamber will be prevented in the event of rupture of the connecting welds.

26 Claims, 7 Drawing Figures

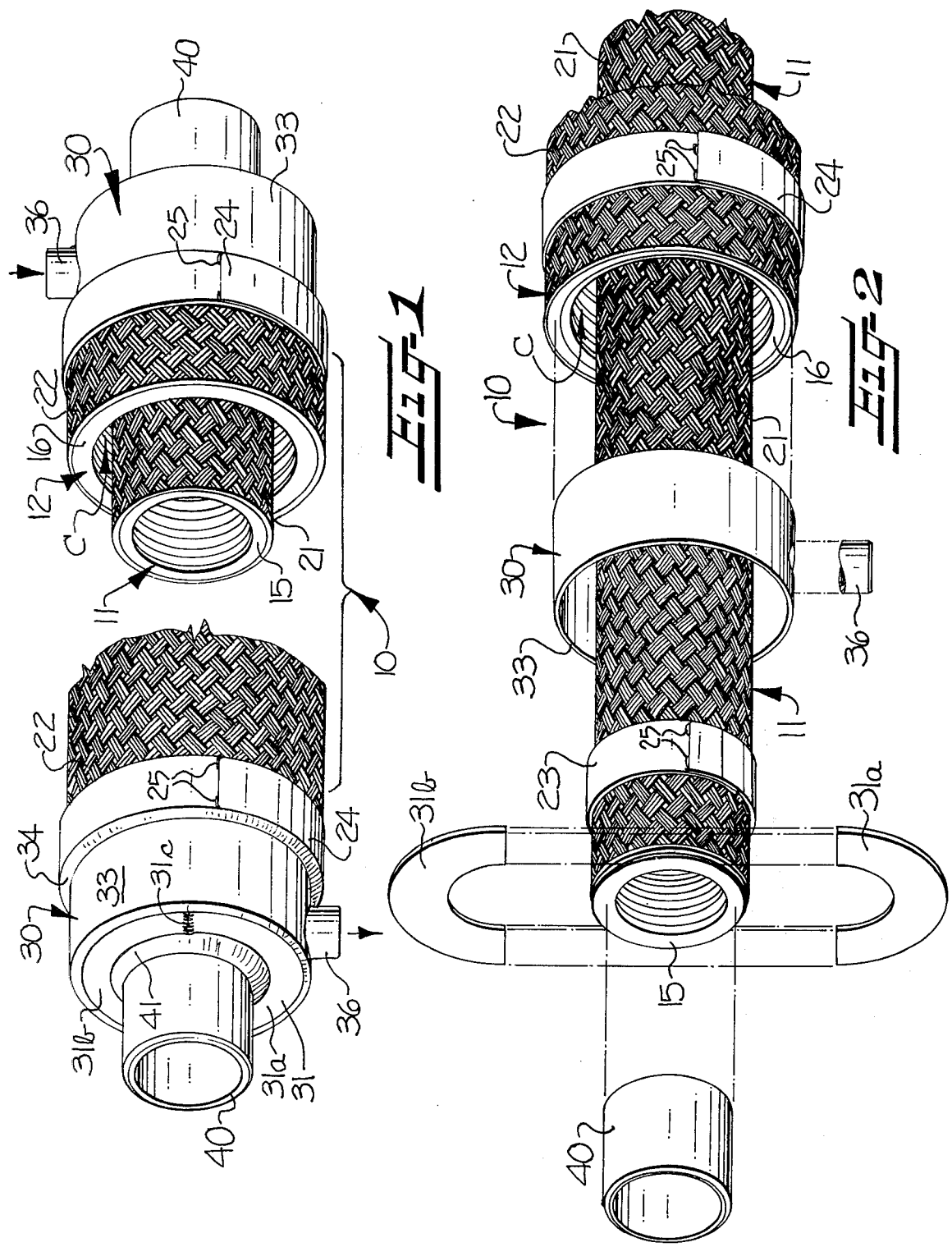

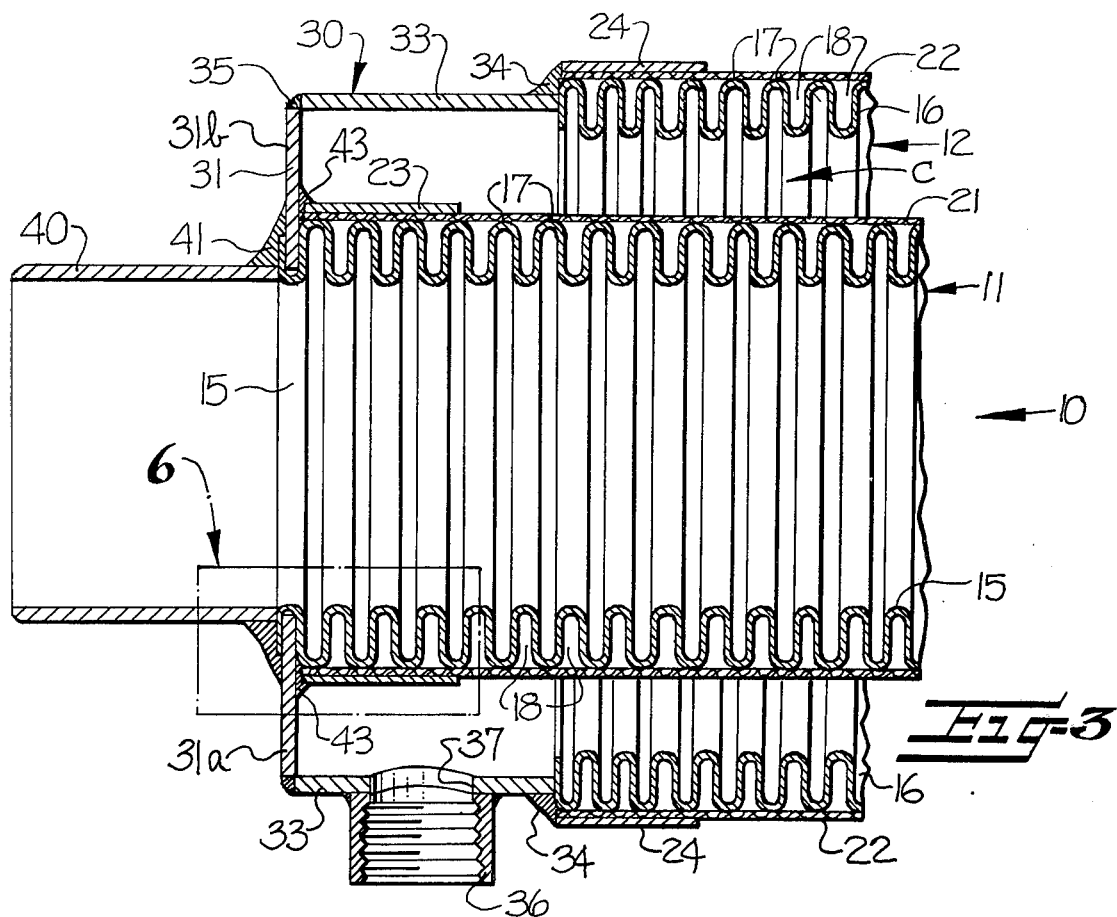
_Fig-3_
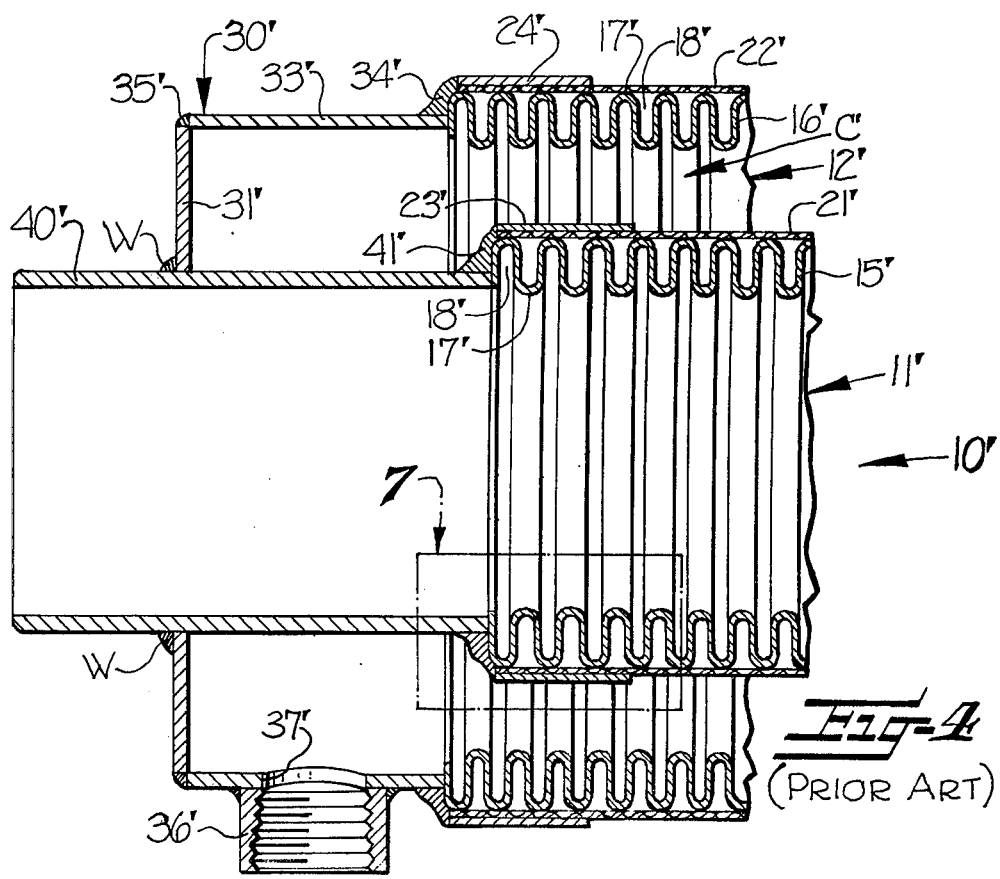
_Fig-4_
(PRIOR ART)

JACKETED PIPE ASSEMBLY FORMED OF CORRUGATED METAL TUBES

This invention relates to jacketed pipe assemblies having inner and outer tubular members composed of respective expansible and contractible corrugated metal tubes and defining therebetween a chamber adapted for the circulation therethrough of a temperature controlling fluid for aiding in the flow of a processing fluid through the inner tubular member.

In the handling of many processing materials in the fluid state, it is necessary to maintain such materials within a critical temperature range which may be cold, temperate or hot, depending upon the individual characteristics of the processing fluid. For example, in order to convey a processing fluid such as melted polyethylene, polypropylene or other melted synthetic plastic material, while maintaining the desired fluid state and flowability thereof, the tubular member or conduit through which the processing fluid is to be conveyed must be maintained at a temperature range sufficiently high to maintain the desired flowability of the processing fluid. Thus, it has been the practice for many years to utilize a jacketed pipe construction for conveying such a processing fluid with at least a substantial length of such jacketed pipe construction being in the form of longitudinally expansible and contractible inner and outer corrugated metal tubes for accommodating contraction and expansion conditions, and so that a temperature controlling fluid could be circulated through a chamber defined between the inner and outer corrugated tubes of the jacketed pipe construction to aid in the flow of the processing fluid through the inner corrugated tube.

However, difficulties having been encountered in prior art jacketed corrugated pipe constructions in that, upon rupture of the welds at opposite ends of the inner corrugated tube there was an immediate danger of cross-contamination, i.e., the fluid would either leak from the inner corrugated tube through the ruptured weld into the temperature controlling fluid-circulating chamber or it would leak from the fluid-circulating chamber through the ruptured weld into the inner corrugated tube.

It is therefore a primary object of this invention to provide a jacketed pipe assembly of inner and outer tubular members composed of respective inner and outer corrugated metal tubes wherein the interconnecting means between the inner and outer corrugated metal tubes includes connecting welds which in the event of rupture thereof and leakage therethrough would vent such leakage to the exterior of both corrugated metal tubes to thereby prevent cross-contamination.

It is a further object of this invention to provide a jacketed pipe assembly of the type described wherein at least one end of the inner corrugated tube is weldingly connected by an exterior weld to a closure member positioned within the endmost valley of the inner corrugated tube, and which closure member defines and end wall of the surrounding temperature controlling fluid-circulating chamber. The closure member and the end of the inner corrugated tube are further connected by the exterior weld to a metal coupling sleeve serving as an extension of the inner corrugated tube whereby, in the event of rupture of the weld, leakage therethrough from within the inner corrugated tube or from the surrounding fluid-circulating chamber will be vented to atmosphere and prevent cross-contamination.

It is a more specific object of this invention to provide a jacketed pipe assembly of the type described wherein the opposite ends of the inner corrugated tube are weldingly connected by exterior welds to respective closure members positioned within the respective endmost valleys of the inner corrugated tube, and which closure members define opposite end walls of the surrounding fluid-circulating chamber. The closure members and the respective ends of the inner corrugated tube are further connected by the exterior welds to respective metal coupling sleeves serving as extensions on opposite ends of the inner corrugated tube, whereby in the event of rupture of the welds, leakage therethrough from within the inner corrugated tube or from the surrounding fluid-circulating chamber will be vented to atmosphere and prevent cross-contamination.

Some of the objects of the invention having been stated, other objects will appear as the description proceeds when taken in connection with the accompanying drawings, in which FIG. 1 is a perspective view of the improved jacketed pipe assembly with medial portions thereof broken away;

FIG. 2 is an enlarged fragmentary perspective view of the left-hand portion of FIG. 1 with parts thereof being shown in exploded relationship;

FIG. 3 is an enlarged longitudinal sectional view through the left-hand end portion of the pipe assembly shown in FIG. 1;

FIG. 4 is a view similar to FIG. 3, but illustrating a typical prior art type of interconnecting means between corresponding ends of inner and outer corrugated metal tubes;

Figure 5:
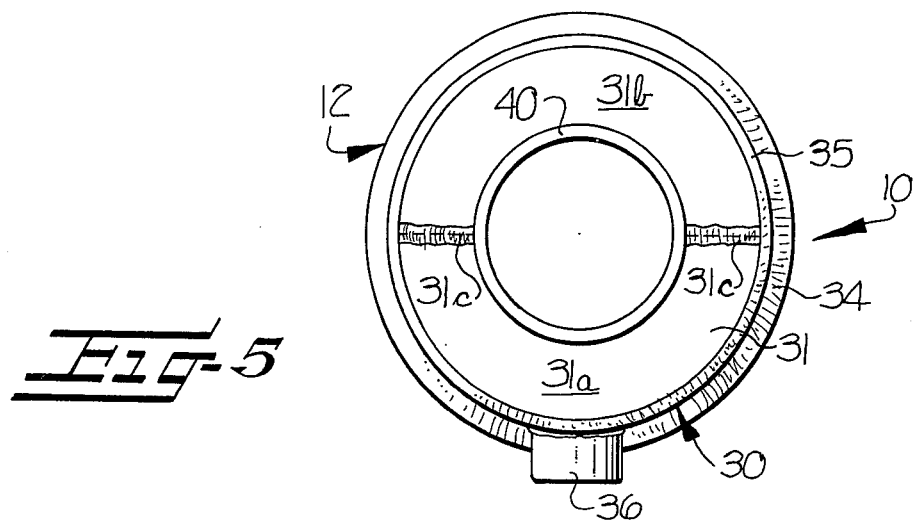
Figure 6:
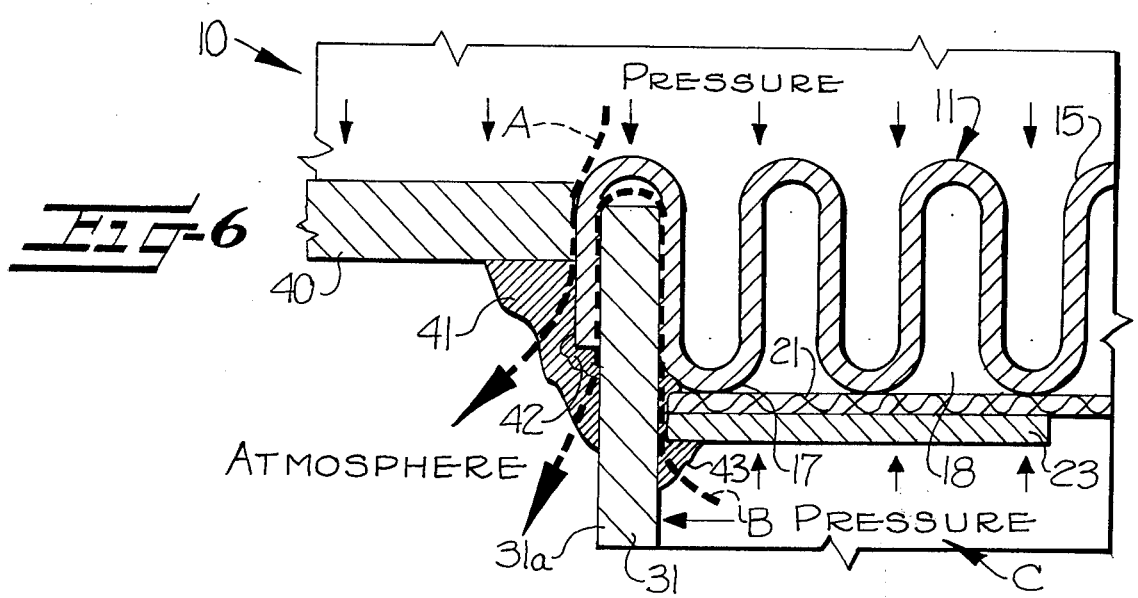
Figure 7:
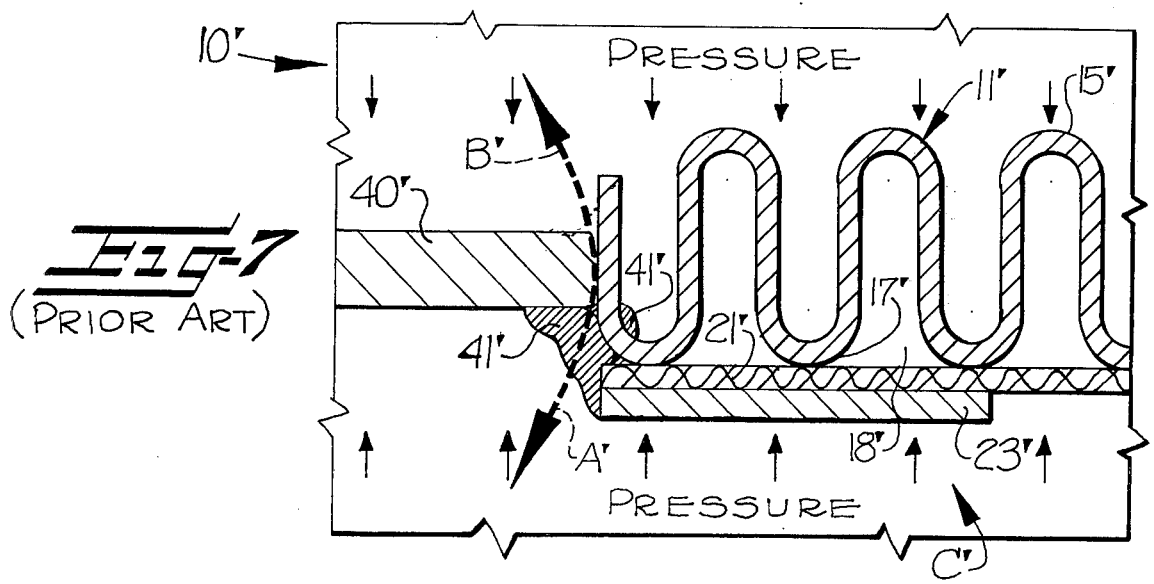

FIG. 5 is an end elevation looking at the left-hand end of the pipe assembly shown in FIG. 1 and particularly illustrating the welded together segments of an end closure member; and FIGS. 6 and 7 are enlarged, schematic, fragmentary views of the broken-line areas identified by the respective numerals 6 and 7 in FIGS. 3 and 4 and illustrating a comparison between the leakage paths of the present jacketed pipe construction (FIG. 6) and the prior art jacketed pipe construction (FIG. 7) in the event of rupture of a continuous weld at the juncture of the inner corrugated tube and a respective metal coupling sleeve extending axially outwardly from the end of the inner corrugated tube.

Referring more specifically to the drawings, and particularly to FIGS. 1, 2, 3, 5 and 6, the numeral 10 broadly designates a preferred embodiment of the jacketed pipe assembly of the present invention which comprises inner and outer tubular members 11, 12 arranged in spaced relation to each other and defining therebetween a fluid-circulating chamber C adapted for the circulation therethrough of a temperature controlling fluid for aiding in the flow of a processing fluid through the inner tubular member 11. The inner and outer tubular members 11, 12 include respective thin-walled inner and outer elongate corrugated metal tubes 15, 16 each having annular ribs 17 and valleys 18 alternately arranged along the length thereof.

As is usual, and as is preferred, inner and outer braided wire sheaths 21, 22 surroundingly cover the respective inner and outer corrugated tubes 11, 12. Although only a single braided wire sheath is shown surrounding each corrugated tube, as is well known, several such sheaths may be arranged in layered relation around either or both of the corrugated tubes 15, 16, if desired. Such braided wire sheaths serve to lend stability to the corrugated tubes 15, 16 by restraining the tubes against excessive writhing or twisting when under high internal pressure and thereby aiding in avoiding rupture of the connecting welds at the ends of the pipe assembly which rupture might otherwise be caused by such writhing or twisting.

Opposite ends of the inner and outer braided wire sheaths 21, 22 terminate adjacent opposite ends of the respective inner and outer corrugated tubes 15, 16, and metal anchoring bands 23, 24 encirclingly engage the terminal ends of the respective inner and outer braided wire sheaths 21, 22 for securing the same to the corrugated tubes 15, 16. Conventionally, each anchoring band 23, 24 may be in the form of a double ended, thin strip of sheet metal with one end overlapping the other and being welded thereto, as at 25 (FIGS. 1 and 2). In this instance, anchoring bands 23, 24 serve as parts of means interconnecting the respective opposite ends of the inner and outer tubular members 11, 12 and the respective corrugated tubes 15, 16 thereof. Such interconnecting means also define opposite end walls of the aforementioned fluid-circulating chamber C.

Since the means interconnecting the respective adjacent ends of the inner and outer tubular members 15, 16 is illustrated in FIG. 1 as being of substantially the same construction at opposite ends of the jacketed pipe assembly 10, only the structure illustrated in the left-hand portion of FIG. 1, and as further illustrated in FIGS. 2, 3, 5 and 6, will be described in detail and like reference characters shall apply to the parts of the interconnecting means between the corrugated tubes 15, 16 in the right-hand portion of FIG. 1, where applicable, to avoid repetitive description. As shown, each interconnecting means is broadly designated at 30 and includes an endless metal member or plate serving as a metal closure member 31 for one end of the fluid-circulating chamber C. Closure member 31 is illustrated as being of annular form in FIGS. 1 and 5, but for convenience in assembling the related components of the interconnecting means 30, closure member 31 is shown as comprising a plurality of segmental plates welded together.

More specifically, the metal closure member 31 is shown as comprising a pair of substantially semicircular plates 31a, 31b which are of generally U-shaped form so as to define a substantially circular opening through the closure member 31 when the ends thereof are welded together, as at 31c in FIGS. 2 and 5. The reason why the metal closure member 31 is of segmental construction is to facilitate positioning the same within the respective endmost valley 18 at the respective outer end of the inner corrugated tube 15 with the closure member 31 extending radially outwardly from inner corrugated tube 15. Thereafter, the segmental plates 31a, 31b are welded together. Although closure member 31 is shown fitting in the outermost exterior valley only of inner corrugated tube 15, it is to be understood that the radially inner portion of closure member 31 may be formed so as to fit in one or more additional exterior valleys 18 of inner corrugated tube 15, if desired.

Means are provided for sealingly interconnecting the outer portion of closure member 31 to the adjacent end of outer tubular member 12. To this end, and to accommodate the circulation of temperature controlling fluid through the fluid-circulating chamber C, it will be observed in FIG. 3 that the end of the inner corrugated tube 15 extends outwardly beyond the adjacent end of the outer corrugated tube 16, and a ring member 33 is spaced from and surrounds the outwardly extending portion of the inner corrugated tube 15. Opposite ends of ring member 33 are sealingly connected, as by being welded at 34 and 35, respectively, to the adjacent end of outer corrugated tube 16 and the radially outer portion of closure member 31. Thus, ring 33 and welds 34, 35 provide means interposed between and sealingly interconnecting the radially outer portion of endless closure member 31 and the adjacent end of outer tubular member 12 to define therewith one end of fluid-circulating chamber C. In this regard, it should be noted that the weld 34 surrounds the inner portion of ring member 33 and also serves to weld the adjacent terminal end of outer braided wire sheath 22 and the outer end of surrounding metal anchoring band 24 to the proximal abutting ends of the outer corrugated tube 16 and ring member 33.

In order to circulate a suitable temperature controlling fluid into, through and out of the fluid-circulating chamber C defined between corrugated tubes 15, 16 and between the respective opposite end portions of inner corrugated tube and the encircling ring members 33, each ring member 33 has a substantially radially outwardly projecting tubular nipple 36 suitably secured thereto, as by welding. Each nipple 36 communicates with the fluid-circulating chamber C through a suitable opening 37 (FIG. 3) in the respective ring member 33. The nipples 36 are adapted for the connection of suitable pipes thereto, not shown, for circulating the temperature controlling fluid through the chamber C. Nipples 36 may be internally or externally threaded, as desired, and are shown internally threaded by way of illustration only.

The particular relative locations of the nipples 36 may be suited to the customer's requirements. However, if the jacketed pipe assembly is to occupy a horizontal position or nearly so, it is generally preferred that the nipple 36 serving as the inlet for the temperature controlling fluid be positioned on the upper portion of the respective ring member 33 and that the other nipple, serving as the outlet, be positioned on the lower portion of the respective ring member 33 as illustrated in the respective right-hand and left-hand portions of FIG. 1. Thus, condensate incident to circulating steam from the right to the left through chamber C, for example, would readily gravitate out of the chamber C.

The corrugated tubes 15, 16 must be capable of longitudinal expansion and contraction to accommodate varying operating conditions, such as fluid pressure variations and/or temperature variations, and they must be formed of a metal which will not contaminate, or impede the flow of, a processing fluid and a temperature controlling fluid therethrough at the proper temperature and pressure. Therefore, the walls of corrugated tubes 15, 16 are formed of a thin metal, e.g., a metal approximately 0.020 inch thick, to accommodate contraction and expansion conditions. Also, in many installations, it is advantageous to utilize stainless steel corrugated tubes in the jacketed pipe assembly so that the metal of the tube walls will not contaminate or impede the flow of the processing fluid or the temperature controlling fluid through tubes 15, 16. By providing the metal closure member 31 with its radially inner portion positioned in the respective endmost valley 18 of inner corrugated tube 15 in accordance with this invention and as shown in FIGS. 3 and 6, the closure member 31 not only cooperates with the inner corrugated tube 15 to prevent cross-contamination between the same and the surrounding fluid-circulating chamber, but it also serves to reinforce and stabilize the terminal end of the thin-walled inner corrugated tube 15 while providing a strong rigid backing for welding components to the end of the inner tube 15.

More particularly, closure member 31 provides a reinforcing backing for welding to the outer end of inner corrugated tube 15 the inner end of a metal coupling sleeve 40, which inner end abuts the outer end of tube 15, with coupling sleeve 40 serving as an extension of the inner corrugated tube 15. As shown in FIGS. 3 and 6, a continuous exterior weld 41 encircles the inner end of metal coupling sleeve 40 and connects the same to the end of inner corrugated tube 15 and to closure member 31. Coupling sleeve 40 is shown as being of annular cross-section, and the inner diameter thereof preferably is about the same as or slightly greater than the innermost diameter of inner corrugated tube 15. The outer diameter of at least the inner end of metal coupling sleeve 40 preferably is less than the outer diameter of inner corrugated tube 15 so that the terminal end of inner corrugated tube 15 extends radially outwardly beyond the abutting inner end of coupling sleeve 40 and so that the terminal end of inner corrugated tube 15 is readily connected by the continuous weld 41.

In this regard, to facilitate securing together inner corrugated tube 15, closure member 31 and coupling sleeve 40, in addition to positioning the segmental plates 31a, 31b of closure member 31 in the endmost valley 18 of inner corrugated tube 15 and welding the plates 31a, 31b together, desirably the radially outer portion of the terminal end of inner corrugated tube 15 is then tack-welded, as at 42 (FIG. 6), to the outside surface of metal closure member 31. The inner end of coupling sleeve 40 then is positioned in abutting relation to the outer end of inner corrugated tube 15, whereupon the continuous weld 41 is formed encircling the inner end of sleeve 40 and preferably encircling the tack-weld 42 and the radially outward end of the terminal end of inner corrugated tube 15.

As is usual, the distal ends of the coupling sleeves at opposite ends of the jacketed pipe assembly are adapted to be welded or otherwise suitably secured to other coupling sleeves, pipes or fittings, not shown, for directing a processing fluid through the jacketed pipe assembly in its course through the associated fluid conveying system.

In order to firmly bond the adjacent outer ends of the inner braided wire sheaths 21 and the respective metal anchoring band 23 to the inside surface of closure member 31, it will be observed in FIG. 6 that the proximal ends of the inner braided wire sheath 21 and the metal anchoring band 23 there shown are spaced from closure member 31 to provide a gap therebetween for facilitating welding of the braided wire sheath 21 and anchoring band 23 together as well as welding the same to the closure member 31. The weld connecting sheath 21, anchoring band 23 and closure member 31 together is indicated at 43 in FIGS. 3 and 6.

As shown in FIG. 6, the weld 43 preferably encircles the outer end of the respective anchoring band 23 and also extends between the closure member 31 and the adjacent ends of sheath 21 and anchoring band 23. Weld 43 may be formed either before of after the continuous exterior weld 41. It is apparent, however, that in order for the proximal surfaces of anchoring band 23 and closure member 31 to be readily accessible to the welder for forming the weld 43, the weld 43 is formed before ring member 33 is positioned around the outer end of inner corrugated tube 15 and welded to outer corrugated tube 16 and closure member 31. In any event, although it is preferred that weld 43 is continuous, it is not essential that it be continuous since fluid will not leak to the exterior of corrugated tubes 15, 16 from chamber C along the endmost valley 18, and between the wall of inner corrugated tube 15 and closure member 31, unless exterior weld 41 is ruptured as will be presently explained.

Now, even through the welder may provide a high quality exterior weld 41 connecting together adjacent portions of inner corrugated tube 15, closure member 31 and coupling sleeve 40, with the quality of the weld 41 exceeding substantially the requirements for withstanding pressure as established by standards of the industry, there are many instances in which the molecular structure of the weld 41 will break down and result in rupture thereof, especially after extensive use of the jacketed pipe assembly under conditions causing substantial vibration thereof. The probability of such rupture of the weld 41 is reduced considerably because of the reinforcement provided by the closure member 31 for the portion of the end of the inner corrugated tube 15 against which the weld 41 is formed. However, in the event of the occurrence of rupture of the weld 41, such as to permit leakage through weld 41 from within either the inner corrugated tube 15 or the surrounding temperature controlling fluid-circulating chamber C, or both, such leakage will be vented to the exterior of both corrugated tubes 15, 16 along the respective paths substantially as represented by the respective dotted lines and arrows indicated at A and B in FIG. 6.

Thus, assuming that each weld 43 is continuous, it can be appreciated that in the event of rupture of either or both of the welds 41 and the respective weld 43 at opposite ends of the jacketed pipe assembly 10, leakage of the processing fluid through either ruptured weld 41 from within the inner corrugated tube 15 and/or leakage of the temperature controlling fluid through either pair of ruptured welds 41, 43 from within the fluid-circulating chamber C will be vented to the exterior of both corrugated tubes 15, 16 and will prevent cross-contamination between the inner corrugated tube 15 and the fluid-circulating chamber C. Also, upon rupture of any one or more of the welds 34, 35 of FIG. 3 at either or both ends of the jacketed pipe assembly 10, leakage therethrough of temperature controlling fluid from chamber C also would be vented to the exterior of both tubes 15, 16. Of course, as indicated above, if weld 43 is continuous and is not ruptured, the welds 34, 35 also are not ruptured, the temperature controlling fluid would not escape from chamber C even if the exterior weld 41 then were in a ruptured state. In any event, leakage of fluid through any of the welds 34, 35, 41 would be readily detected by an attendant so that corrective measures could be taken before such leakage created a more serious problem.

By way of comparison of the present invention with the prior art, there will be observed in FIGS. 4 and 7 one end poriton of a jacketed pipe assembly 10′ of the prior art construction for which the instant invention is an improvement. To avoid repetitive description, parts of the jacketed pipe assembly shown in FIGS. 4 and 7 which correspond to parts previously described with reference to FIGS. 1, 2, 3, 5 and 6 will, where applicable, bear the same reference characters with the prime notation added. As shown in FIG. 4, the prior art closure member 31' may be of annular form and may be slid over the outer end of metal coupling sleeve 40' for mounting the closure member 31' thereon, since the prior art closure member 31' surrounds and is welded, at W, to a medial or intermediate portion of metal coupling sleeve 40'. However, sleeve 40' extends inwardly flom closure member 30' so that the terminal end of the inner corrugated tube 15' also must be spaced inwardly from closure member 31'.

Thus, the continuous weld 41', which encircles the inner end of the prior art coupling sleeve 40' and secures the same in abutting relation against the end of inner corrugated tube 15', is enclosed entirely within the fluid-circulating chamber C for the temperature controlling fluid. Additionally, the endmost valley 18' of the prior art inner corrugated tube 15' is devoid of any reinforcing or backing means therein to stabilize and strengthen the weld. Also, the heat required in effecting the weld 41' could weaken the endmost portion of the inner corrugated tube 15' due to the melting away of the non-reinforced thin wall of the inner corrugated tube 15' and the consequent need for filling any gaps thus formed in the wall of the corrugated tube 15' with the welding material. Thus, even though both the prior art weld 41' and the weld 41 of the present invention could be of similar high quality, the prior art weld 41' (FIG. 7) would be more readily ruptured by vibration of the jacketed pipe assembly 10' than would the weld 41 (FIG. 6) of the jacketed pipe assembly 10 of the present invention. Of course, the welded joint formed by the weld 41' of the prior art also differs from the welded joint formed by the weld 41 of the present invention in that adjacent ends of the metal wire sheath 21' and the metal anchoring band 23' are not welded to a reinforcing plate, but instead, are welded to the terminal end of the inner corrugated tube 15' and the inner end of coupling sleeve 40' by the continuous weld 41'.

It can thus be seen that upon rupture of the weld 41' of the prior art jacketed pipe assembly 10, there is an immediate danger of cross-contamination. More specifically, as represented by the arrows A', B', in FIG. 7, the fluid would either leak from the inner corrugated tube 15' through the ruptured weld 41' into the temperature controlling fluid-circulating chamber C' or it would leak from the fluid-circulating chamber C' through the ruptured weld 41' into the inner corrugated tube 15', depending upon whether the processing fluid in the inner corrugated tube was under a greater amount of pressure than the temperature controlling fluid in the fluid-circulating chamber C', or vice versa. Although the endmost portion of the inner corrugated tube 15' of the prior art (FIG. 7) is shown facing radially inwardly, it is apparent that, in the event of rupture of the prior art weld 40', cross-contamination also would occur if the endmost portion of the inner corrugated tube faced radially outwardly.

It is thus seen that there is provided an improved jacketed pipe assembly having inner and outer tubular members composed of respective inner and outer elongated corrugated metal tubes defining therebetween a fluid-circulating chamber and wherein respective opposite ends of the inner and outer tubular members are interconnected by connecting welds which are so positioned that, in the event of rupture of the connecting welds and leakage therethrough, such leakage would be vented to the exterior of both tubular members to thereby prevent cross-contamination.

As described herein, both ends of the improved jacketed pipe assembly 10 are of substantially the same construction. It is contemplated however, that one end of the jacketed pipe assembly may be constructed in the manner described herein, with the other end being of different construction without departing from the invention, e.g., the other end of the jacketed pipe assembly may be constructed in accordance with my invention as disclosed in a copending application filed concurrently herewith and entitled CORRUGATED JACKETED PIPE ASSEMBLY HAVING VENTED ENCLOSURES FOR CONNECTING WELDS.

In the drawings and specification there has been set forth a preferred embodiment of the invention, and although specific terms are employed, they are used in a generic and descriptive sense only and not for purposes of limitation.

That which is claimed is:

1. A jacketed pipe assembly constructed to avoid cross-contamination and comprising inner and outer tubular members arranged in spaced relation to each other and defining therebetween a fluid-circulating chamber adapted for the circulation therethrough of a temperature controlling fluid for aiding in the flow of a processing fluid through said inner tubular member, and inner and outer tubular members including respective inner and outer elongated corrugated metal tubes, an endless metal member surrounding one end of said inner corrugated tube and extending radially outwardly therefrom, means interposed between and sealingly interconnecting the radially outer portion of said endless metal member and the adjacent end of said outer tubular member to define therewith one end of the fluid-circulating chamber, a metal coupling sleeve serving as an extension of said inner corrugated tube and having its inner end abutting said one of said inner corrugated tube, and a continuous exterior weld encircling the inner end of said coupling sleeve and connecting the same to the end of said inner corrugated tube and to said endless metal member whereby in the event of rupture of the continuous exterior weld, leakage therethrough from within said inner corrugated tube or from said surrounding fluid-circulating chamber will be vented to the exterior of both tubular members and thereby prevent cross-contamination.

2. A jacketed pipe assembly constructed to avoid cross-contamination and comprising inner and outer tubular members arranged in spaced relation to each other and defining therebetween a fluid-circulating chamber adapted for the circulation therethrough of a temperature controlling fluid for aiding in the flow of a processing fluid through said inner tubular member, said inner and outer tubular members including respective inner and outer elongated corrugated metal tubes each having annular ribs and valleys alternately arranged along the length thereof, means interconnecting respective opposite ends of said inner and outer tubular members and defining opposite end walls of said fluid-circulating chamber, said means interconnecting at least one of the respective ends of said inner and outer tubular members including a metal closure member surrounding said inner corrugated tube and being positioned within the endmost valley thereof and extending radially outwardly therefrom, means sealingly interconnecting the outer portion of said closure member to the adjacent end of said outer tubular member, a metal coupling sleeve serving as an extension of said inner corrugated tube and having its inner end abutting the end of said inner corrugated tube, and a continuous exterior weld encircling the inner end of said metal coupling sleeve and connecting the same to the end of said inner corrugated tube and to said closure member whereby, in the event of rupture of the weld, leakage therethrough from within said inner corrugated tube or from said surrounding fluid-circulating chamber will be vented to the exterior of both tubular member and thereby prevent cross-contamination.

3. A structure according to claim 2 wherein the end of said inner corrugated tube extends radially outwardly beyond the inner end of said coupling sleeve abutting the same so as to be readily connected by said continuous weld.

4. A structure according to claim 2 wherein said metal closure member surrounding said inner corrugated tube comprises a plurality of segmental plates welded together.

5. A structure according to claim 2 wherein said metal closure member positioned within the endmost valley of said inner corrugated tube is of substantially annular form and comprises a pair of substantially semicircular plates welded together.

6. A structure according to claim 2 wherein said means sealingly interconnecting the outer portion of said closure member to the adjacent end of said outer tubular member comprises a metal ring member having its opposite ends welded to the outer portion of said closure member and to the adjacent end of said outer corrugated tube respectively. tube, 7. A structure according to claim 6 including a nipple secured to and projecting radially outwardly from said ring membber and communicating with said chamber for flow of fluid therethrough.

8. A structure according to claim 6 including inner and outer braided wire sheaths surroundingly covering the respective inner and outer corrugated tubes and terminating adjacent said closure member and said ring member, respectively, and metal anchoring bands encirclingly engaging the terminal ends of the respective inner and outer braided wire sheaths and being welded to said closure member and said ring member, respectively.

9. A structure according to claim 2 including a braided wire sheath surroundingly covering said inner corrugated tube and terminating adjacent said closure member, and a metal anchoring band encircling the terminal end of said braided wire sheath and being welded to said closure member.

10. A structure according to claim 2 including a braided wire sheath surroundingly covering said inner corrugated tube and terminating adjacent said closure member, and a metal anchoring band encircling the terminal end of said braided wire sheath and being welded to said closure member and to said braided wire sheath.

11. A structure according to claim 10 wherein said metal anchoring band is spaced from said closure member to provide a gap therebetween for facilitating welding of said braided wire sheath to said anchoring band and said closure member.

12. A jacketed pipe assembly constructed to avoid cross-contamination and comprising inner and outer tubular members arranged in spaced relation to each other and defining therebetween a fluid-circulating chamber adapted for the circulation therethrough of a temperature controlling fluid for aiding in the flow of a processing fluid through said inner tubular member, said inner and outer tubular members including respective inner and outer elongated corrugated metal tubes, an endless metal member surrounding each end of said inner corrugated tube and extending radially outwardly therefrom, means interposed between and sealingly interconnecting the radially outer portion of each endless metal member and the respective adjacent end of said outer tubular member to define therewith a respective end of the fluid-circulating chamber, a metal coupling sleeve serving as an extension of each end of said inner corrugated tube and having its inner end abutting the respective end of said inner corrugated tube, and a continuous exterior weld encircling the inner end of each coupling sleeve and connecting the same to the end of said inner corrugated tube and to the respective endless metal member whereby in the event of rupture of the continuous exterior weld, leakage therethrough from within said inner corrugated tube or from said surrounding fluid-circulating chamber will be vented to the exterior of both tubular members and thereby prevent cross-contamination.

13. A jacketed pipe assembly constructed to avoid cross-contamination and comprising inner and outer tubular members arranged in spaced relation to each other and defining therebetween a fluid-circulating chamber adapted for the circulation therethrough of a temperature controlling fluid for aiding in the flow of a processing fluid through said inner tubular member, said inner and outer tubular members including respective inner and outer elongate corrugated metal tubes each having annular ribs and valleys alternately arranged along the length thereof, means interconnecting respective opposite ends of said inner and outer tubular members and comprising metal closure members surrounding opposite ends of said inner corrugated tube and being positioned within the respective endmost valleys thereof and extending radially outwardly therefrom to define opposite end walls of said fluid-circulating chamber, means sealingly interconnecting the outer portion of each closure member to the adjacent end of said outer tubular member, metal coupling sleeves serving as extensions of respective opposite ends of said inner corrugated tube and having their inner ends abutting the respective adjacent ends of said inner corrugated tube, and a continuous exterior weld encircling the inner end of each metal coupling sleeve and connecting the same to the respective adjacent end of said inner corrugated tube and to the adjacent closure member whereby, in the event of rupture of either weld, leakage therethrough from within said inner corrugated tube or from said surrounding fluid-circulating chamber will be vented to the exterior of both tubular members and thereby prevent cross-contamination.

14. A structure according to claim 13 wherein each end of said inner corrugated tube extends radially outwardly beyond the inner end of the respective coupling sleeve abutting the same so as to be readily connected by the respective continuous weld.

15. A structure according to claim 13 wherein each metal closure member surrounding said inner corrugated tube comprises a plurality of segmental plates welded together.

16. A structure according to claim 13 wherein each of said metal closure members positioned within a respective endmost valley of said inner corrugated tube is of substantially annular form and comprises a pair of substantially semicircular plates welded together.

17. A structure according to claim 13 including a braided wire sheath surroundingly covering said inner corrugated tube, opposite ends of said braided wire sheath terminating adjacent the respective closure members, and metal anchoring bands encircling the terminal ends of said braided wire sheath and being welded to said respective closure members.

18. A structure according to claim 13 including a braided wire sheath surroundingly covering said inner corrugated tube and having opposite ends terminating adjacent the respective closure members, and metal anchoring bands encircling the terminal ends of said braided wire sheath and being welded to said respective closure members and to the respective ends of said braided wire sheath.

19. A structure according to claim 18 wherein said metal anchoring bands are spaced from the respective closure members to provide respective gaps therebetween for facilitating welding of said braided wire sheath to said anchoring bands and said closure members.

20. A jacketed pipe assembly constructed to avoid cross-contamination and comprising inner and outer elongate corrugated metal tubes arranged in spaced relation to each other and defining therebetween a fluid-circulating chamber adapted for the circulation therethrough of a temperature controlling fluid for aiding in the flow of a processing fluid through said inner corrugated tube, said inner and outer corrugated tubes each having annular ribs and valleys alternately arranged along the length thereof, means interconnecting respective opposite ends of said inner and outer corrugated tubes and defining opposite end walls of said fluid-circulating chamber, said means interconnecting at least one of the respective ends of said inner and outer corrugated tubes including a metal closure member surrounding said inner corrugated tube and being positioned within the endmost valley thereof and extending radially outwardly therefrom, a ring member spaced from and surrounding an outwardly extending portion of said inner corrugated tube and being sealingly connected to the adjacent end of said outer corrugated tube and to the outer portion of said closure member, a metal coupling serving as an extension of said inner corrugated tube and having its inner end abutting the end of said inner corrugated tube, and a continuous exterior weld encircling the inner end of said metal coupling sleeve and connecting the same to the end of said inner corrugated tube and to said closure member whereby, in the event of rupture of the weld, leakage therethrough from within said inner corrugated tube or from said surrounding fluid-circulating chamber will be vented to the exterior of both tubular member and thereby prevent cross-contamination.

21. A structure according to claim 20 wherein the end of said inner corrugated tube extends radially outwardly beyond the inner end of said coupling sleeve abutting the same so as to be readily connected by said continuous weld.

22. A structure according to claim 20 including inner and outer braided wire sheaths surroundingly covering the respective inner and outer corrugated tubes and terminating adjacent said closure member and said ring member, respectively, and metal anchoring bands encirclingly engaging the terminal ends of the respective inner and outer braided wire sheaths and being welded to said closure member and said ring member, respectively.

23. A structure according to claim 20 including a nipple secured to and projecting radially outwardly from said ring member and communicating with said chamber for flow of fluid therethrough.

24. A jacketed pipe assembly constructed to avoid cross-contamination and comprising inner and outer elongate corrugated metal tubes arranged in spaced relation to each other and defining therebetween a fluid-circulating chamber adapted for the circulating therethrough of a temperature controlling fluid for aiding in the flow of a processing fluid through said inner corrugated tube, said inner and outer corrugated tubes each having annular ribs and valleys alternately arranged along the length thereof, means interconnecting each of the respective opposite ends of said inner and outer corrugated tubes and comprising a metal closure member surrounding said inner corrugated tube and being positioned within the endmost valley thereof and extending radially outwardly therefrom to define an end wall of said fluid-circulating chamber, a ring member spaced from and surrounding an outwardly extending portion of said inner corrugated tube and being sealingly connected to the adjacent end of said outer corrugated tube and to the outer portion of said closure member, a metal coupling sleeve serving as an extension of said inner corrugated tube and having its inner end abutting the end of said inner corrugated tube, and a continuous exterior weld encircling the inner end of said metal coupling sleeve connecting the same to the end of said inner corrugated tube and to said closure member whereby, in the event of rupture of the weld, leakage therethrough from within said inner corrugated tube or from said surrounding fluid-circulating chamber will be vented to the exterior of both tubular members and thereby prevent cross-contamination.

25. A structure according to claim 24 including inner and outer braided wire sheaths surroundingly covering the respective inner and outer corrugated tubes, opposite ends of said inner braided wire sheath terminating adjacent said metal closure members, opposite ends of said outer braided wire sheath terminating adjacent said ring members, and respective metal anchoring bands encirclingly engaging opposite ends of the respective braided wire sheaths and being welded to said closure members and said ring members, respectively.

26. A structure according to claim 24 including a nipple secured to and projecting radially outwardly from each ring member and communicating with said chamber for circulation of fluid into, through and out of said chamber.

* * * * *

UNITED STATES PATENT AND TRADEMARK OFFICE
CERTIFICATE OF CORRECTION

PATENT NO. : 3,934,618

DATED : January 27, 1976

INVENTOR(S) : James R. Henderson

It is certified that error appears in the above-identified patent and that said Letters Patent are hereby corrected as shown below:

Column 1, Line 61, "and" should be --an--. Column 6, Line 31, change the first occurrence of "the" to --that--; same column, Line 59, after "tured" insert --and--. Column 7, Line 14, change "flom" to --from--; same column, Line 62, "40'" should be --41'--. Column 8, Line 33, CLAIM 1, the first occurrence of "and" should be --said--. Column 9, Line 15, CLAIM 2, "member" should be --members--; same column, Line 37, CLAIM 6, delete "tube"; same column, Line 40, CLAIM 7, "membber" should be --member--. Column 11, Line 51, CLAIM 20, after "coupling" insert --sleeve--; same column, Line 61, CLAIM 21, "member" should be --members--. Column 12, Line 21, CLAIM 24, "circulating" should be --circulation--; same column, Line 41, after "sleeve" insert --and--.

Signed and Sealed this first Day of June 1976

[SEAL]

Attest:

RUTH C. MASON
Attesting Officer

C. MARSHALL DANN
Commissioner of Patents and Trademarks